May 19, 1931.  J. W. BATCHELDER  1,806,440
SPEED TRANSMISSION MECHANISM
Filed Nov. 27, 1929   3 Sheets-Sheet 1
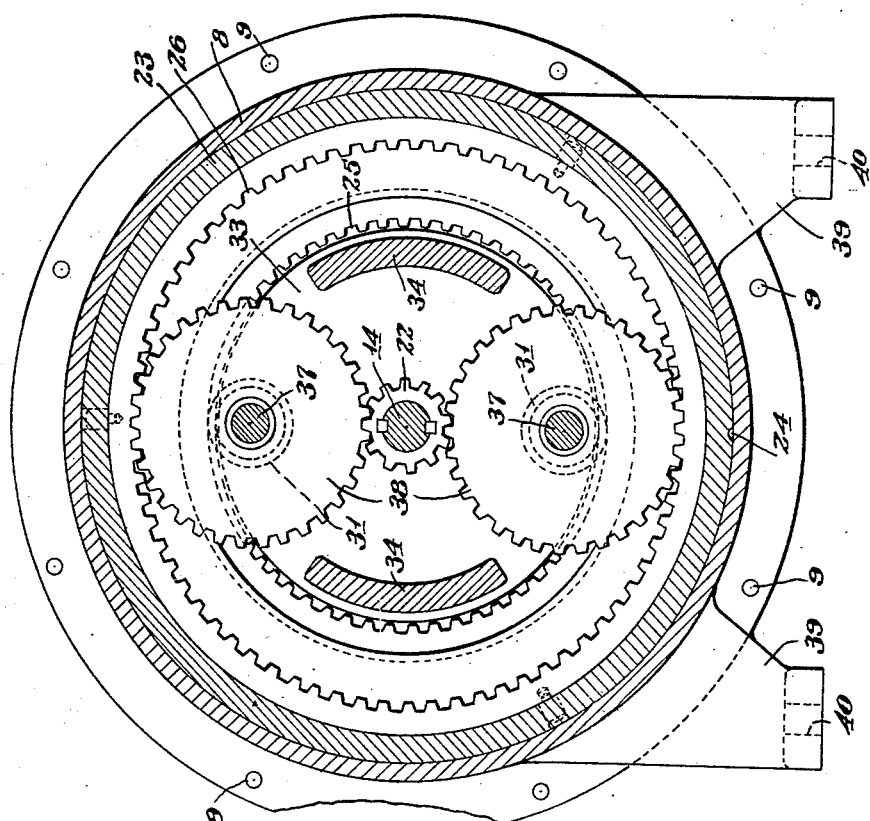
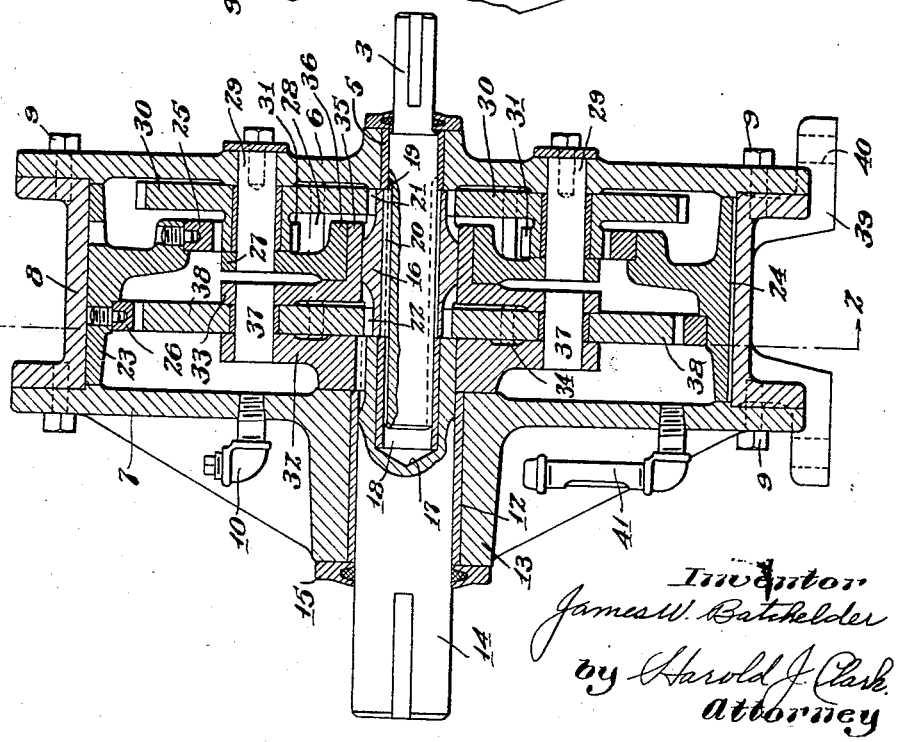
Inventor
James W. Batchelder
by Harold J. Clark
Attorney May 19, 1931.   J. W. BATCHELDER   1,806,440
SPEED TRANSMISSION MECHANISM
Filed Nov. 27, 1929   3 Sheets-Sheet 2
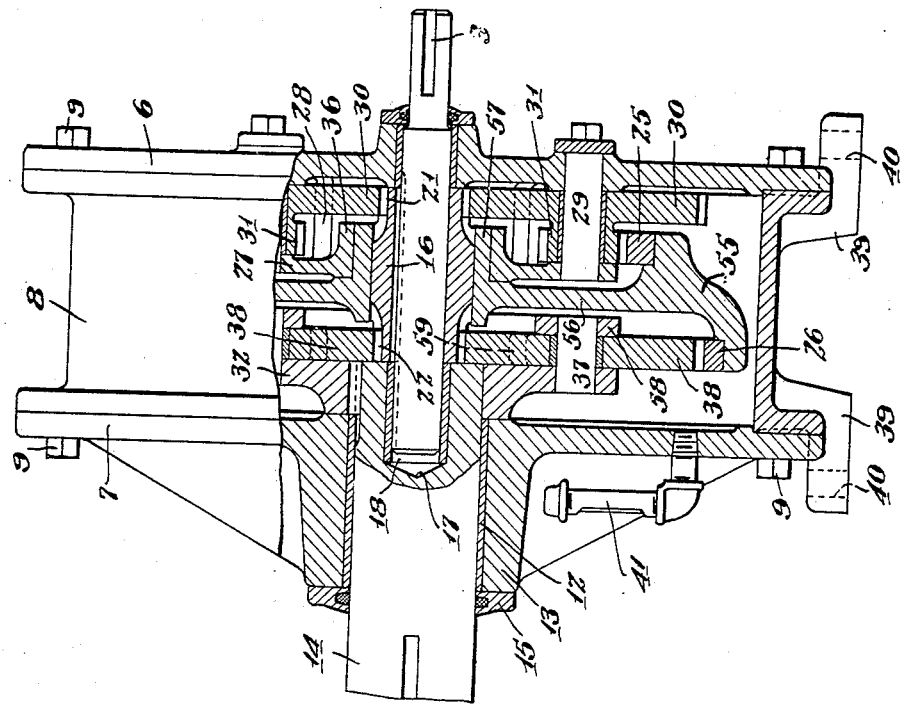
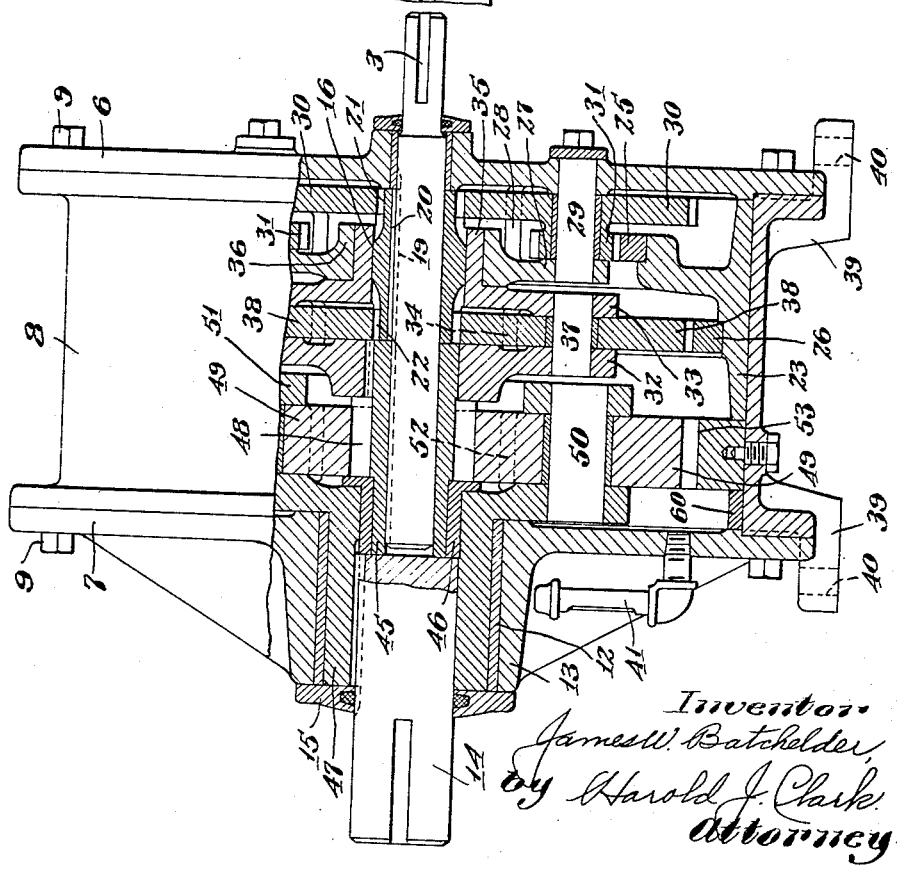
Inventor
James W. Batchelder
by Harold J. Clark
Attorney

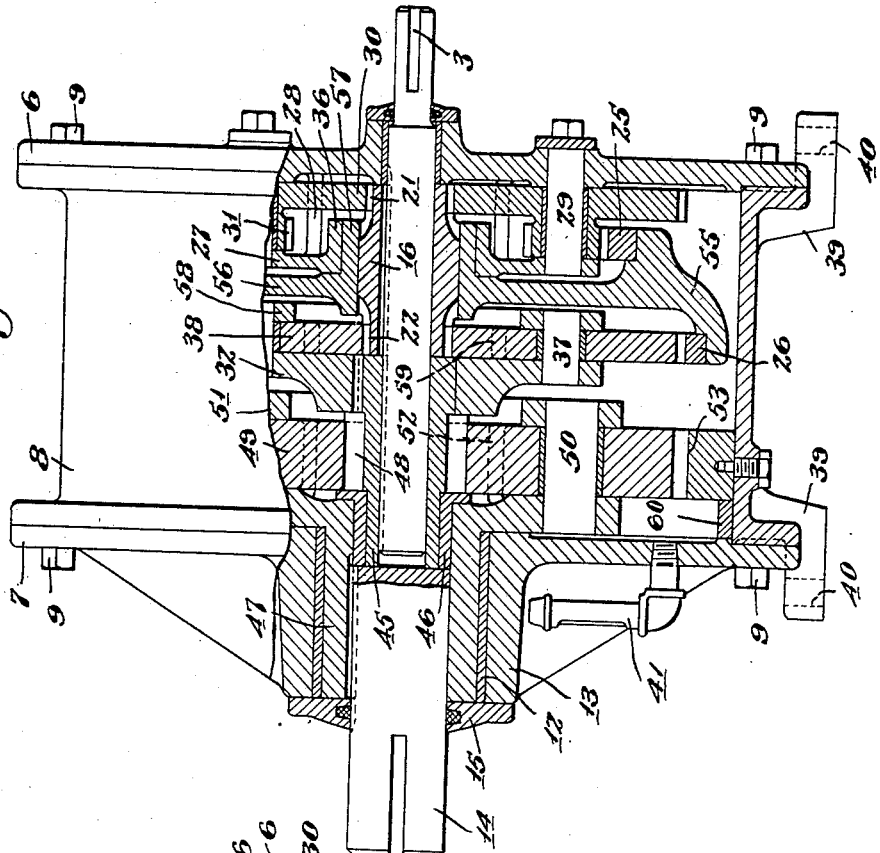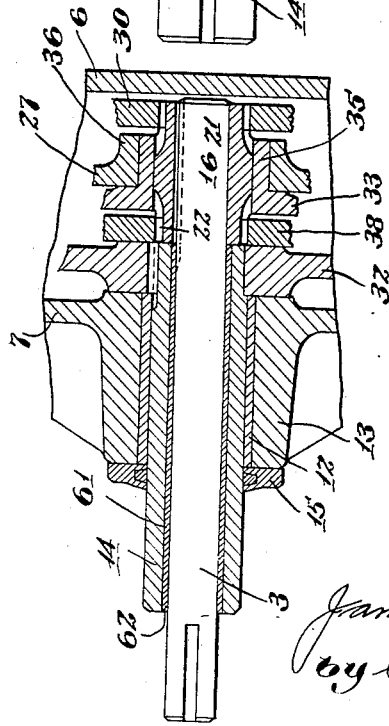

Patented May 19, 1931

1,806,440

UNITED STATES PATENT OFFICE

JAMES W. BATCHELDER, OF BROOKLINE, MASSACHUSETTS

SPEED TRANSMISSION MECHANISM

Application filed November 27, 1929. Serial No. 410,051.

The invention of the present application relates to devices and apparatus for use in the transmission and reduction of speeds.

An important object of this invention is the provision of apparatus which will reduce the speeds of present prime movers to entirely practical and usable degrees.

Another object of this invention is the releasing of all present restrictions as to the operating speeds of said prime movers insofar as the reduction apparatus is concerned and irrespective of the ultimate speed of the driven mechanism utilized.

Another object of the invention is the provision of apparatus capable of being easily and readily reversible in its direction of rotation.

A further feature of my invention resides in the fact that by the utilization of my apparatus a wide range of speed reduction is obtainable with the entire elimination of all detrimental step effects.

A still further object of the invention resides in the simplicity of the mechanism or apparatus by means of which I accomplish the above briefly mentioned highly desirable results.

By the utilization of my improved speed reduction mechanism, also, I am enabled to use high speeds of prime movers which, as will be readily understood, will greatly reduce the size, expense and space necessary for both the prime mover and the reduction unit.

My improved apparatus may be applied to or operated by prime movers of any type or nature, such as steam driven engines, turbines, gas engines, oil engines, electric motors or any other type of prime mover. All of those prime movers just mentioned tend to develop increased horsepower as their speed is increased. Such speed heretofore has been limited to a great extent by the speed reduction unit or mechanism which has been interposed between the source of power and the driven machine or element. Such prior reduction units when constructed with high ratios, such as the worm drive, have been inefficient or are extremely intricate, complicated, cumbersome and expensive. This is particularly true when utilizing the multiple stage planetary transmission.

Another object of the present invention, therefore, is the elimination or obviating of the above outlined difficulties and disadvantages which have been present in prior speed reduction mechanisms.

By my improved apparatus the amount of available energy is greatly increased, with a consequent decrease in the fuel or power necessary to be supplied to a prime mover.

Another feature of my present invention resides in the fact that with my improved mechanism I am enabled to generate and deliver a tremendous torque or turning effect.

In my present apparatus there is no limit to the amount of reduction which may be obtained, as has been present in prior multiple gear reduction units, worm drives, and complex belting and chain arrangements.

Because of the simplicity of construction of my improved device the time of continuous operation will be greatly increased owing to the low number of working parts and the simplicity and economy with which they may be replaced.

Many important advantages result from my invention; for example, when utilizing an electric motor as the prime mover a great saving in copper windings and other materials will be effected because of the increased operating speed permitted by my improved reduction mechanism.

Other types of prime movers may be made much smaller and correspondingly simpler as well as being, as will be readily understood, much less expensive than prior cumbersome mechanisms.

My improved speed reduction device is compact, inexpensive to manufacture, relatively light in weight and effective and efficient to a high degree. In the preferred form of the invention, the reduction unit is entirely housed within a unitary casing, which completely surrounds and encloses said unit, forming a dust-tight, oil-tight container. Because of this housed-in feature, likelihood of accidents or injury is reduced, there being no access to the working parts while the mechanism is functioning. In case of breakage of any of the rotating or moving parts in the reduction unit, the housing or casing will prevent injury by flying parts, a danger which is ever present in exposed mechanism or devices of this character. Also, by utilizing a single unitary casing, and providing a proper supply of lubricant therein, all working and moving parts will be constantly assured of adequate lubrication.

Another and important object of the invention resides in the provision of a speed reduction mechanism which is self-locking when the power is removed from the driving shaft. Thus when my improved apparatus is utilized in hoisting mechanism, and it is desired to stop a load in mid air, the power may be removed from the driving shaft, and the load will remain in suspension. Thus my improved device constitutes an effective brake for holding the load or the work being operated upon at any desired point. It will be appreciated, of course, that the high speed shaft may be reversed in its rotation with equal facility and simplicity.

As illustrated in the drawings of the instant application, the reduction of speed is accomplished by means of two or more trains of gears, the interposed driving pinions or idlers of one train being fixed relative to the slow speed shaft, while the pinions or idlers of one of the other trains are fixed to a spider or retainer, said retainer being mounted on a slow speed shaft in such manner and position as to receive an epicyclic motion imparted by the trains of gears at a speed which is a resultant of the difference in size of the initial driving gears, if any, the difference in size of the driven gears on the opposite sides of the interposed pinions, and the difference in peripheral speed of said oppositely positioned gears. The means of contact of the interposed driving pinions with their respective contacting members may be of any kind of toothed or friction type desired.

Other features and objects of the invention reside in the particular construction and arrangement of the parts thereof.

Another feature of the present invention resides in the total elimination of all forms of bevel gearing, I utilizing spur gearing throughout the structure. Spur gearing is far superior to bevel gearing in many ways. By the elimination of bevel gearing the life of the reduction structure is greatly increased, while at the same time the cost of manufacture and assembly is decreased. Many spur gears may be mounted on the same arbor and cut simultaneously, as opposed to the individual cutting operations necessary on beveled gears.

Another feature of the present invention is that by the structures illustrated, the high speed shaft is relieved of all radial loads, thus being free to carry out its function of transmitting torque without being encumbered in the manner heretofore required, thus enabling the high speed shaft to function at a higher degree of efficiency and torque transmission. This is a very valuable feature, particularly in hoisting mechanism, as it enables the high speed shaft to transmit torque to the slow speed shaft through the medium of the reduction unit, without the necessity of carrying restraining burdens.

The structures illustrated herein are largely for illustrative purposes, as other means of operating the high speed shaft, as well as the trains of gears or oppositely rotating members, will occur to those skilled in the art.

The above and other features and objects of the invention, details of construction, combinations of parts, and advantages, will be hereinafter more fully pointed out, described and claimed.

Referring to the drawings, illustrating preferred embodiments of the present invention, Fig. 1 is a longitudinal sectional view of the reduction unit;

Fig. 2 is a vertical sectional view on the line 2—2 of Fig. 1;

Fig. 3 is a side elevation, partly in section, of the reduction unit with the addition of a simple gear train;

Fig. 4 is a side elevation, partly in section, illustrating a slightly different form of internal gear carrying frame;

Fig. 5 is a side elevation, partly in section, illustrating the addition of a simple gear train to the structure of Fig. 4; and Fig. 6 is a longitudinal sectional view illustrating the arrangement of high and slow speed shafts particularly adapted for hoists.

Referring now to the drawings, for a particular description of the invention, its construction and operation, 3 designates a high speed shaft having a bearing in a bushing 5 carried in a central bearing on the wall or partition 6. A second end wall 7 is provided, and interposed between the end walls 6 and 7 is a cylindrical member 8, the walls 6 and 7 being secured to said member 8 by bolts 9, or in any other desired manner. These end walls and cylindrical member constitute a housing or unitary casing, into which lubricant may be admitted through a breather pipe 10.

A bushing 12 is carried in the bearing 13 of the end wall 7, and the slow speed shaft 14 has a bearing in said bushing, a stuffing box 15 being secured to the bearing portion 13 in any desired manner. Provided in the slow speed shaft 14 is a recess 17, in which is housed a bushing 18, and the high speed shaft 3 extends into said recess and has a bearing in said bushing. It will thus be apparent that the high speed shaft 3 is axially concentric with and has a bearing in the slow speed shaft 14 in this form of the invention.

Keyways 19 are provided in the shaft 3, and keys 20 rigidly connect a sleeve 16 to said shaft 3. Formed integral with each end of the sleeve 16 are pinions 21 and 22. An annular frame or ring 23 is provided within the casing, having a running clearance within the inner wall of the member 8, this ring being provided with any desired number of oil grooves 24. Thus the ring 23 is supported by the casing, and puts no load whatever on the high speed shaft 3. Carried by the ring 23 are a pair of internal gears 25 and 26, these gears being, as illustrated, of varying diameters. Said internal gears may be held in said frame in any desired manner, the retaining means shown being for illustrative purposes only.

A disc 27 is fixed to the end wall 6 by webs 28, the said disc 27 and wall 6 thus forming a retainer. A plurality of pins 29 are mounted in said retainer, one end of each of said pins having a bearing in said disc 27 and the other end of each of said pins having a bearing in the wall 6. Carried by each of said pins 29 is a compound gear, comprising a gear 30 in mesh with and rotated by the pinion 21 on the sleeve 16, and a gear 31 of less diameter than the gear 30 in mesh with and adapted to rotate the internal gear 25 and hence the frame 23.

Keyed to the slow speed shaft 14 is a retainer comprising a pair of discs 32 and 33 united by webs 34, the disc 33 having a tubular journal 35 which projects into and has a bearing and support in the bearing 36 of the disc 27. Pins 37 are carried by the last mentioned retainer, the ends of said pins having bearings in the discs 32 and 33 respectively. Mounted on said pins 37 are a plurality of gears 38 in mesh with and rotated by the pinion 22 on the sleeve 16, said gears 38 also being in mesh with and tending to rotate the internal gear 26 and hence the frame 23.

It will be instantly apparent, from a glance at the drawings, that the high speed shaft 3 is relieved of all radial loads of any nature, as well as any tangential force, each pinion 21 and 22 being diametrically or oppositely engaged by the gears 30 and 38, and the weight or load of the sleeve 23, retainers, and gears, all being supported and carried by the casing and the slow speed shaft. Thus the high speed shaft is freed of restraint, and is enabled to function simply and solely to transmit torque from any desired source of power, through the pinions 21 and 22 to the differential unit.

Legs or supports 39 form a part of the casing, and serve as a support therefor, apertures 40 being provided through said legs by means of which the device may be secured to the floor, a bench, or other suitable support. An oil gauge 41 is also provided to check the supply of lubricant in the casing.

The operation of my improved reduction apparatus is simple, and will be readily understood by those skilled in this art, being briefly described as follows:

Rotation being imparted to the high speed shaft 3, the driving pinion 21 will likewise be rotated at the same speed as the shaft 3. Thereupon the idler gears 30 and reduced portions 31 will be rotated, effecting a rotation of the internal gear 25, and the frame 23 by which said internal gear is carried, in a direction opposite to the direction of rotation of the pinion 21. The rotative speed of the frame 23 will be considerably less than the rotative speed of the pinion 21, due to the difference in ratios between the internal gear 25 and the pinion 21. Simultaneously with the rotation of the pinion 21, the pinion 22 will be rotated. Rotation of said pinion 22 will effect rotation of the idlers 38 which are meshing with the internal gear 26, and would normally tend to rotate said internal gear 26 at a speed of rotation faster than the speed of rotation of the internal gear 25. This tendency on the part of the pinion 22 to rotate the internal gear 26 faster than the internal gear 25 is overcome by the rotation of the internal gear 25 by the pinion 21, said gear 25 and pinion 21 restraining the frame 23 from rotating faster than it is rotated by said pinion 21 and gear 25. Said restraining force on the frame 23 will set up an epicyclic movement of the idler gears 37 around the driving pinion 22. This epicyclic movement will in turn be imparted to the retainer comprising the discs 32 and 33 and to the slow speed shaft 14 to which said retainer is secured. The ratio of speed between the slow speed shaft 14 and the high speed shaft 3 will thus be dependent upon the varying ratios between the two gear trains.

It will thus be apparent that high ratios are capable of attainment, through my invention, in simple structure. No prior speed reduction mechanism, of which I am aware, is capable of producing these ratios without the use of complicated, expensive, cumbersome, and inefficient structures.

The advantages, benefits, savings, high ratios of speed reductions, and other features of this invention will be instantly apparent to those skilled in this art, and since I believe that the mechanism by means of which these advantages are obtained is novel, I have claimed the same in the present application.

While I have illustrated the driving pinions 21 and 22 as being integral with the sleeve 16, it will be appreciated that said driving pinions may be rigidly secured to the shaft 3 with equal facility. However, by the provision of the sleeve 16, and because of the extending of the keyways 19 to the free end of the shaft 3, said shaft 3 may be removed from the unit without disassembling said unit, thus simplifying my novel structure still further.

My improved reduction unit will automatically function as a brake, or means to hold a load or work being operated upon in any desired position. If it is assumed that the device is being utilized in hoisting mechanism, and a load has been raised to a point at which it is desired to be held, the high speed shaft 3 may be stopped, and the load will remain in suspension. Any tendency on the part of the load to set up a reverse movement within the reduction unit will be overcome by the fact that such movement would be transmitted to the idler gears 30 and their reduced portions 31, but, because of the fact that said gears would be simultaneously engaged on opposite sides, such movement would be thereby restrained.

Another very important advantage obtained from the structure illustrated in Fig. 1 is the fact that by having the frame 23 formed as a ring or sleeve and supported by the casing, without any web or hub supported on the high speed shaft, the gear trains are enabled to be positioned much closer together, thus conserving considerable space and enabling the reduction unit to be embodied in a compact casing.

Fig. 3 represents a reduction unit similar to Fig. 1, but with the addition of a train of simple gears, by means of which an additional speed reduction is effected in a simple manner. In this form I provide a sleeve 45 surrounding the high speed shaft and supported at one end in a bushing 46 in the retainer 47, said retainer being keyed to the slow speed shaft as clearly illustrated. The retainer disc 32 is keyed to this sleeve 45 and formed integral on said sleeve is a pinion 48, meshing with a plurality of opposed simple gears 49 carried on pins 50, said pins being supported at one end in the retainer 47 and at the other end in a ring 51, said ring forming a part of the retainer 47 and being fixed thereto by webs 52. The simple gears 49 are in mesh with an internal gear 53 fixed to the member 8 in any desired manner. A spacing ring 60 is provided between the wall 7 and internal gear 53 for abutment and strength, as well as alinement.

The advantages of this form of the invention will be instantly apparent to those skilled in the art. While the unit illustrated in Fig. 1 will attain very considerable reductions, the addition of the simple train of gears illustrated will enable still further reductions to be obtained.

As the retainer comprising the discs 32 and 33 is revolved through the epicyclic movement of the gears 38, said retainer will effect rotation of the sleeve 45 and pinion 48. This will cause rotation of the gears 49, and because of the ratio existing between the pinion 48 and internal gear 53, will effect an epicyclic movement of said gears 49 around the pinion 48. This epicyclic movement will be converted into rotations of the retainer 47 and hence of the slow speed shaft 14 to which said retainer 47 is keyed. This form of the invention is particularly adaptable for use in hoisting devices, and is possessed of the important advantage mentioned in the description of the structure of Fig. 1, that is, that the high speed shaft is relieved of all radial load and tangential forces, as well as the other advantages mentioned.

In Fig. 4 is illustrated a slight modification of the structure illustrated in Fig. 1. In this form, in place of the close-fitting frame 23, I utilize an annular frame 55 having a disc or web 56 provided with a tubular journal 57. This journal 57 is seated in the hub 36 of the disc 27 and thereby supports the frame 55 without imposing any radial load on the high speed shaft 3. Also, in the form illustrated in Fig. 4, I have utilized a ring 58 united to the disc 32 by webs 59, instead of utilizing a disc 33 as illustrated in Fig. 1.

Fig. 5 illustrates the application of the additional simple train of gears illustrated in Fig. 3 to the reduction unit illustrated in Fig. 4, this assembly being obvious from Figs. 3 and 4, and needing no further detailed description herein.

In Fig. 6 I have illustrated a slight modification of the arrangement of the slow speed shaft 14 and high speed shaft 3, which will be utilized in certain installations, such as hoists. In this modification the slow speed shaft 14 is provided with a bore 61 extending completely therethrough, a bushing 62 being housed in said bore, and the shaft 3 having its bearing in said bushing. This modification enables the high speed shaft 3 to be driven from the same side of the reduction unit as the device or mechanism operated by the slow speed shaft 14, such as in hoists, tending to still further conserve space and increase the compactness and efficiency of this structure.

While I have necessarily illustrated and described the various phases of my invention somewhat in detail, it will be appreciated that I may vary the size, shape and arrangement of parts within reasonably wide limits, without departing from the spirit of the invention.

My invention is further described and defined in the form of claims as follows:

1. Speed reduction mechanism, comprising a casing, a slow speed shaft, a high speed shaft, a pair of pinions rotatable by said high speed shaft, a plurality of opposed compound gears rotatable by one of said pinions, a plurality of opposed simple gears rotatable by the other of said pinions, and a pair of internal gears, one of said internal gears being in mesh with said compound gears and the other of said internal gears being in mesh with said simple gears, whereby an epicyclic movement will be imparted to one of said sets of gears, said casing constituting a support for all of said pinions and said gears, whereby said high speed shaft is relieved of all radial loads and tangential forces.

2. Speed reduction mechanism, comprising a unitary casing, a slow speed shaft, a high speed shaft, a pair of pinions rotatable by said high speed shaft, an annular frame rotatable in and supported by said casing, a pair of internal gears carried by said frame, a plurality of gears interposed between each of said pinions and their respective internal gears, a retainer for each of said sets of interposed gears, one of said retainers being supported by said casing, the other of said retainers being supported by said slow speed shaft, and means on said retainers cooperating therewith to relieve said high speed shaft of all radial load.

3. Speed reduction mechanism, comprising a unitary casing, a slow speed shaft, a high speed shaft, a pair of pinions rotatable by said high speed shaft, an annular frame rotatable in and supported by said casing, a pair of internal gears carried by said frame, a plurality of opposed gears interposed between each of said pinions and their respective internal gears to relieve said high speed shaft of all tangential force, a retainer for each of said sets of opposed interposed gears, one of said retainers being supported by said casing, the other of said retainers being supported by said slow speed shaft, and means on said retainers cooperating therewith to relieve said high speed shaft of all radial load.

4. Speed reduction mechanism, comprising a unitary casing, a slow speed shaft, a high speed shaft, a pair of pinions rotatable by said high speed shaft, a rotatable annular frame having a running clearance within said casing and being supported thereby, a pair of internal gears carried by said frame, a plurality of gears interposed between each of said pinions and their respective internal gears, a retainer for each of said sets of interposed gears, one of said retainers being supported by said casing, the other of said retainers being supported by said slow speed shaft, and said pinions being supported by one of said retainers, whereby said high speed shaft is relieved of all radial load.

5. Speed reduction mechanism, comprising a unitary casing, a slow speed shaft, a high speed shaft, a pair of pinions rotatable by said high speed shaft, a rotatable annular frame having a running clearance within said casing and being supported thereby, a pair of internal gears carried by said frame, a plurality of opposed gears interposed between each of said pinions and their respective internal gears, a retainer for each of said sets of interposed gears, one of said retainers being supported by said casing, the other of said retainers being supported by said slow speed shaft, and said pinions being supported by one of said retainers, whereby said high speed shaft is relieved of all radial load and tangential force.

6. Speed reduction mechanism, comprising a unitary casing, a slow speed shaft, a high speed shaft, a pair of pinions rotatable by said high speed shaft, a rotatable annular frame having a running clearance within said casing and being supported thereby, a pair of internal gears carried by said frame, a plurality of opposed compound gears interposed between one of said pinions and its respective internal gear, a plurality of simple gears interposed between the other of said pinions and its respective internal gear, a retainer for each of said sets of interposed gears, one of said retainers being supported by said casing, and the other of said retainers being supported by said slow speed shaft, whereby said high speed shaft is relieved of all radial load and tangential force.

7. Speed reduction mechanism, comprising a slow speed shaft, a high speed shaft, a pair of pinions rotatable by said high speed shaft, an annular frame, a pair of internal gears carried by said frame, a plurality of opposed compound gears interposed between one of said pinions and one of said internal gears, a plurality of opposed simple gears interposed between the other of said pinions and the other of said internal gears, a retainer fixed to said slow speed shaft, a plurality of opposed simple gears carried by said retainer, a third pinion meshing with said last named simple gears, and means to transmit movement from said first named simple gears to said last named pinion, whereby a rotative movement of said retainer will be effected.

8. Speed reduction mechanism, comprising a casing, a slow speed shaft, a high speed shaft, a pair of pinions rotatable by said high speed shaft, an annular frame supported by said casing, a pair of internal gears carried by said frame, a retainer fixed to one wall of said casing, a plurality of compound gears carried by said retainer and interposed between one of said pinions and one of said internal gears, a retainer fixed to said slow speed shaft and supported by said casing, a plurality of simple gears carried by said second retainer, a third retainer supported by said first retainer, a plurality of simple gears carried by said third retainer and interposed between the other of said pinions and the other of said internal gears, a sleeve surrounding said high speed shaft and supported by said second and third retainers, said sleeve being keyed to said third retainer, and a pinion on said sleeve meshing with the simple gears carried by said second retainer.

9. Speed reduction mechanism, comprising a casing, a slow speed shaft, a high speed shaft, a pair of pinions rotatable by said high speed shaft, an annular frame supported by said casing, a pair of internal gears carried by said frame, a retainer fixed to one wall of said casing, a plurality of compound gears carried by said retainer and interposed between one of said pinions and one of said internal gears, a retainer fixed to said slow speed shaft and supported by said casing, a plurality of simple gears carried by said second retainer, a third retainer supported by said first retainer, a plurality of simple gears carried by said third retainer and interposed between the other of said pinions and the other of said internal gears, a sleeve surrounding said high speed shaft and supported by said second and third retainers, said sleeve being keyed to said third retainer, and a pinion formed integral with said sleeve and meshing with the simple gears carried by said second retainer.

10. Speed reduction mechanism, comprising a casing, a slow speed shaft, a high speed shaft, a sleeve rotatable by said high speed shaft, a pair of pinions formed integral with said sleeve, an annular frame supported by said casing, a pair of internal gears carried by said frame, a retainer fixed to one wall of said casing, a plurality of compound gears carried by said retainer and interposed between one of said pinions and one of said internal gears, a retainer fixed to said slow speed shaft and supported by said casing, a plurality of simple gears carried by said second retainer, a third retainer supported by said first retainer, a plurality of simple gears carried by said third retainer and interposed between the other of said pinions and the other of said internal gears, a sleeve surrounding said high speed shaft and supported by said second and third retainer, said sleeve being keyed to said third retainer, and a pinion on said sleeve meshing with the simple gears carried by said second retainer.

11. Speed reduction mechanism, comprising a casing, a slow speed shaft, a high speed shaft, a pair of pinions rotatable by said high speed shaft, an annular frame supported by said casing, a pair of internal gears carried by said frame, a retainer fixed to one wall of said casing, a bearing on said retainer, a plurality of compound gears carried by said retainer and interposed between one of said pinions and one of said internal gears, a retainer fixed to said slow speed shaft and supported by said casing, a plurality of simple gears carried by said second retainer, a third retainer, a tubular journal thereon seated in the bearing of said first retainer and supporting said third retainer, a plurality of simple gears carried by said third retainer and interposed between the other of said pinions and the other of said internal gears, a sleeve surrounding said high speed shaft and supported by said second and third retainers, said sleeve being keyed to said third retainer, and a pinion formed integral with said sleeve and meshing with the simple gears carried by said second retainer.

12. Speed reduction mechanism, comprising a casing, a slow speed shaft, a high speed shaft, a pair of pinions rotatable by said high speed shaft, an annular frame supported by said casing, a pair of internal gears carried by said frame, a retainer fixed to one wall of said casing, a plurality of compound gears carried by said retainer and interposed between one of said pinions and one of said internal gears, a retainer fixed to said slow speed shaft and supported by said casing, a plurality of simple gears carried by said second retainer, an internal gear fixed to said casing and in mesh with said simple gears, a third retainer supported by said first retainer, a plurality of simple gears carried by said third retainer and interposed between the other of said pinions and the other of said internal gears, a sleeve surrounding said high speed shaft and supported by said second and third retainers, said sleeve being keyed to said third retainer, and a pinion on said sleeve meshing with the simple gears carried by said second retainer.

13. Speed reduction mechanism comprising a casing, a slow speed shaft, a high speed shaft, a pair of pinions rotatable by said high speed shaft, an annular frame supported by said casing, a pair of internal gears carried by said frame, a retainer fixed to one wall of said casing, a plurality of opposed gears carried by said retainer and interposed between one of said pinions and one of said internal gears, a retainer fixed to said slow speed shaft and supported by said casing, a plurality of gears carried by said second retainer, a third retainer supported by said first retainer, a plurality of gears carried by said third retainer and interposed between the other of said pinions and the other of said internal gears, a sleeve surrounding said high speed shaft and supported by said second and third retainers, said sleeve being keyed to said third retainer, and a pinion on said sleeve meshing with the gears carried by said second retainer.

14. Speed reduction mechanism comprising a casing, a slow speed shaft, a high speed shaft, a pair of pinions rotatable by said high speed shaft, an annular frame supported by said casing, a pair of internal gears carried by said frame, a retainer fixed to one wall of said casing, a plurality of opposed gears carried by said retainer and interposed between one of said pinions and one of said internal gears, a retainer fixed to said slow speed shaft and supported by said casing, an internal gear fixed to said casing and in mesh with the gears carried by said second retainer, a third retainer supported by said first retainer, a plurality of gears carried by said third retainer and interposed between the other of said pinions and the other of said internal gears, a sleeve surrounding said high speed shaft and supported by said second and third retainers, said sleeve being keyed to said third retainer, and a pinion on said sleeve meshing with the gears carried by said second retainer.

15. Speed reduction mechanism, comprising a fixed unitary casing, a slow speed shaft, a retainer rigidly fixed to said slow speed shaft, a high speed shaft, a pair of pinions rotatable by said high speed shaft, a second retainer fixed to said casing and constituting a support for said first retainer, an annular frame rotatable in and supported by said casing, a pair of internal gears carried by said frame, and a plurality of gears interposed between each of said pinions and their respective internal gears.

16. Speed reduction mechanism, comprising a unitary casing, a slow speed shaft, a high speed shaft, a pair of pinions rotatable by said high speed shaft, an annular frame rotatable in and supported by said casing, a pair of internal gears carried by said frame, a plurality of opposed gears interposed between each of said pinions and their respective internal gears, a retainer for each of said sets of opposed interposed gears, one of said retainers being fixed to said slow speed shaft, and the other of said retainers being fixed to said casing and constituting a support for said first retainer and said slow speed shaft, whereby said high speed shaft is relieved of all radial loads.

17. Speed reduction mechanism, comprising a slow speed shaft, a high speed shaft, a pair of pinions rotatable by said high speed shaft, a pair of internal gears, a plurality of gears interposed between each pinion and each internal gear, and means to maintain all of said elements in constant alinement and relieve said high speed shaft of all radial loads and tangential forces.

18. Speed reduction mechanism comprising a casing, a slow speed shaft, a high speed shaft, a pair of pinions rotatable by said high speed shaft, an annular frame supported by said casing, a pair of internal gears carried by said frame, a retainer fixed to one wall of said casing, a plurality of opposed gears carried by said retainer and interposed between one of said pinions and one of said internal gears, a retainer fixed to said slow speed shaft and supported by said casing, a plurality of gears carried by said second retainer, a third retainer suported by said first retainer, a plurality of gears carried by said third retainer and interposed between the other of said pinions and the other of said internal gears, a sleeve surrounding said high speed shaft and supported by said third retainer, and a pinion on said sleeve meshing with the gears carried by said second retainer.

19. In a speed reduction mechanism, a casing, a slow speed shaft, a high speed shaft, a retainer fixed at one side to said slow speed shaft, a tubular journal on the opposite side of said retainer, and means fixed to said casing and engaged by said journal to constitute a support for said slow speed shaft from each side of said retainer.

20. Speed reduction mechanism, comprising a casing having a bearing in one side thereof, a slow speed shaft supported by said bearing, a high speed shaft, a retainer having a tubular journal on one side thereof, said retainer being fixed on the other side to said slow speed shaft, a second retainer fixed to the opposite side of said casing, a bearing in said second retainer to support said tubular journal and maintain constant alinement therewith, whereby said slow speed shaft is supported on each side of said casing, and said high speed shaft is relieved of all radial loads.

21. In a speed reduction mechanism, a slow speed shaft, a high speed shaft, a retainer, a tubular journal on one side thereof, said retainer being fixed on the other side to said slow speed shaft, a second retainer, a bearing therein supporting said tubular journal, and means to support said slow speed shaft and said second retainer.

22. Speed reduction mechanism, comprising a casing, a slow speed shaft, a high speed shaft, a retainer, a tubular journal on one side thereof, said retainer being fixed on the other side to said slow speed shaft, a second retainer fixed to said casing, a bearing therein in which said tubular journal is supported and whereby constant alinement between said retainers is maintained.

23. In a speed reduction mechanism, a casing, a slow speed shaft, a high speed shaft, a pinion operable by said high speed shaft, a retainer fixed on one side to said slow speed shaft, a plurality of opposed gears carried by said retainer, an internal gear, said opposed gears being interposed between said pinion and said internal gear, a journal on the opposite side of said retainer, and means on said casing engaging said journal to support the other side of said retainer.

24. In a speed reduction mechanism, a casing, a slow speed shaft, a high speed shaft, a pair of pinions operable by said high speed shaft, an annular frame rotating within and supported by said casing, a pair of internal gears supported by said annular frame, a plurality of interposed gears meshing with said pinions and said internal gears, a retainer for each of said sets of interposed gears, one of said retainers being fixed to said slow speed shaft and the other of said retainers being supported by said casing, and means to maintain said retainers in constant alinement.

25. In a speed reduction mechanism, a casing, a bearing at each side thereof, a slow speed shaft supported by one of said bearings, a retainer fixed at one side to said slow speed shaft, a tubular journal fixed to the opposite side of said retainer and supported by the other of said bearings in said casing, whereby the slow speed shaft is supported at each side of said casing and all elements are maintained in constant alinement.

26. In a speed reduction mechanism, a slow speed shaft, a high speed shaft, a pinion operable by said high speed shaft, a retainer fixed at one side to said slow speed shaft, a plurality of opposed gears carried by said retainer, an internal gear, said opposed gears meshing with said pinion and said internal gear, a tubular journal on the opposite side of said retainer, and means engaging said journal to support said retainer and said slow speed shaft.

27. In a speed reduction mechanism, a casing, a slow speed shaft, a high speed shaft, a pair of pinions operable by said high speed shaft, an annular frame rotatable within said casing, a pair of internal gears supported by said annular frame, a plurality of interposed gears meshing with said pinions and said internal gears, a retainer for each of said sets of interposed gears, one of said retainers being fixed to said casing, said fixed retainer having a tubular bearing therein, and a tubular journal on the other of said retainers, said tubular journal being seated in and supported by the tubular bearing in the fixed retainer.

In testimony whereof, I have signed my name to this specification.

JAMES W. BATCHELDER.